US007712706B2

(12) United States Patent
Bullock et al.

(10) Patent No.: US 7,712,706 B2
(45) Date of Patent: May 11, 2010

(54) SPACE TETHERS FOR LIMITING THE DYNAMIC RESPONSE OF STRUCTURES

(75) Inventors: Steven J. Bullock, Riverside, CA (US); David B. Robinson, Del Aire, CA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 11/671,865

(22) Filed: Feb. 6, 2007

(65) Prior Publication Data
US 2008/0185481 A1    Aug. 7, 2008

(51) Int. Cl.
*B64G 1/22* (2006.01)
(52) U.S. Cl. ................................... 244/158.2
(58) Field of Classification Search ............. 244/158.1, 244/158.2, 172.6, 172.9, 110 C, 173.2; 188/378; 343/878
See application file for complete search history.

(56) References Cited

U.S. PATENT DOCUMENTS 4,813,815 A * 3/1989 McGehee .................. 405/202
6,260,807 B1 * 7/2001 Hoyt et al. ................. 244/158.2
7,213,931 B2 * 5/2007 Strieber ...................... 359/853
2002/0170792 A1 * 11/2002 Phelan et al. ............... 188/378

OTHER PUBLICATIONS

Lawrence, Charles and J. Mark Hickman. Structural Design Concepts for a Multi-Megawatt Solar Electric (SEP) Spacecraft. NASA Technical Memorandum 105148. Aug. 1991.*

* cited by examiner

*Primary Examiner*—Timothy D Collins
*Assistant Examiner*—Michael Kreiner
(74) *Attorney, Agent, or Firm*—Lee & Hayes, PLLC

(57) ABSTRACT

Methods and systems for providing space tethers for limiting the dynamic response of structures are disclosed. In one embodiment, a method for limiting the dynamic response of a structure having a base member and a substructure projecting outwardly from the base member includes coupling a first end of an elongated flexible tether to the substructure at a first location spaced apart from the base member; and coupling a second end of the elongated flexible tether to the base member at a second location spaced apart from the substructure, the tether being configured to be in a non-taut configuration when the substructure moves within a design volume with respect to the base member, the tether being further configured to be in a taut position when the substructure displaces to a limit of the design volume.

12 Claims, 4 Drawing Sheets

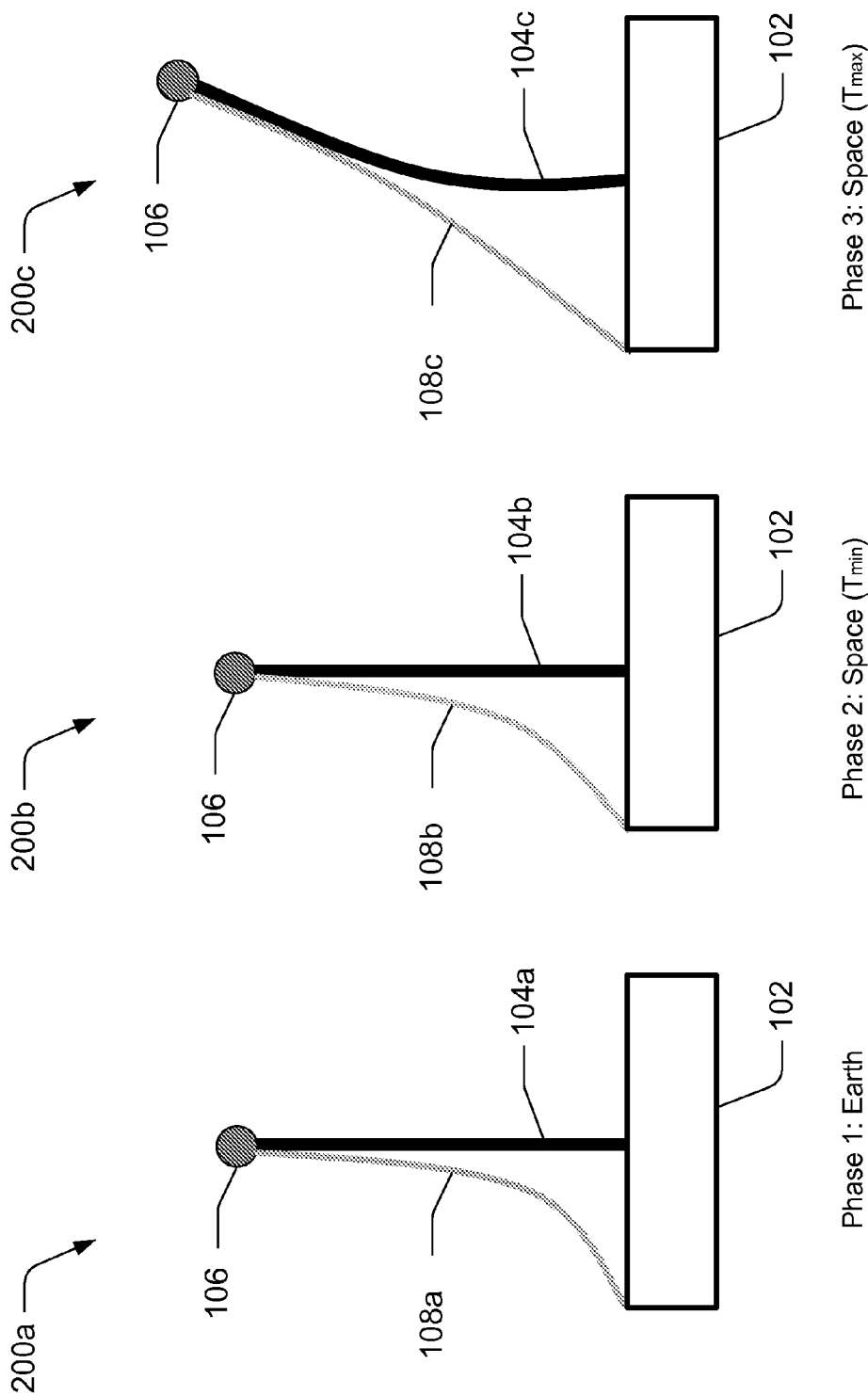

Phase 1.5: Launch Vibrations

SPACE TETHERS FOR LIMITING THE DYNAMIC RESPONSE OF STRUCTURES

FIELD OF THE INVENTION

The invention relates to methods and systems for utilizing space tethers on structures, and more specifically, to methods and systems for providing space tethers for limiting the dynamic response of structures.

BACKGROUND OF THE INVENTION

Satellite transport into space has become a commonplace occurrence as reliance in satellite based technology continues to expand. Satellites may be launched into space in cargo holds of spacecraft or on top of rockets. Often, satellites contain large and lightweight structures such as antennas which cannot sustain high loads or high displacement during launch into space or during ground tests prior to launch. Once in orbit, satellites must be able to sustain thermal distortions without adversely affecting the satellite's functionality.

To overcome displacement and high load stresses on satellite structures, designers often add additional reinforcements to the structure, extra material, beams, securing braces, or padding to assure structural integrity of the satellite's structures during launch. However, such additional reinforcements may detrimentally affect the mission performance. For example, heavy reinforcements contribute additional mass to the payload of the spacecraft and thus increases cost. Once in orbit satellites must be capable of operating under exposure to thermal distortions. Additional reinforcement structures may interfere with the satellite's thermal distortions and may adversely affect the lightweight structure's position and operation. Reinforcement structures which are removed in space, such as by pyrotechnic launch locks, are problematic as they often require additional processes, complexity, mass, and cost to the launch mission.

The launch and transport of satellites into space only requires a short period of time in comparison to the entire lifespan of the satellite in orbit. During the launch phase, the satellite's structure must be capable of sustaining high loads without incurring damage, therefore dynamic displacements must be limited. During the remainder of the satellite's mission, while the satellite is in orbit, the satellite's operation may be significantly improved by the absence of redundant load paths (e.g., reinforcement structures) and minimized loads caused by thermal distortions.

Therefore, there exists a need for improved methods and systems for limiting the dynamic response of structures during the launch phase of space transport, while minimizing redundant constraints on lightweight satellite structures that experience thermal distortions while in orbit.

SUMMARY

Embodiments of methods and systems for providing space tethers for limiting the dynamic response of structures are disclosed. Embodiments of methods and systems in accordance with the present disclosure may advantageously improve operation and reliability of structures subjected to high stresses during space launch and thermal distortions while in space.

In one embodiment, a method for limiting the dynamic response of a structure having a base member and a substructure projecting outwardly from the base member includes coupling a first end of an elongated flexible tether to the substructure at a first location spaced apart from the base member; and coupling a second end of the elongated flexible tether to the base member at a second location spaced apart from the substructure, the tether being configured to be in a non-taut configuration when the substructure moves within a design volume with respect to the base member, the tether being further configured to be in a taut position when the substructure displaces to a limit of the design volume.

In another embodiment, a system includes a structure including a base member; a elongated structure coupled at one end to the base member; and an elongated flexible tether attached to the base member and at least one of the elongated structure and base member, the tether configured to be in a non-taut configuration when the substructure moves within a design volume with respect to the base member, the tether being further configured to be in a taut position when the substructure displaces to a limit of the design volume.

In a further embodiment, a method of dampening dynamic response of a space structure includes determining the structure predicted deformation during a mission; determining a design volume for allowable dynamic response of the structure during the mission; configuring an elongated flexible tether suitable for coupling between two attachment locations on the structure, including determining at least two attachment points on the structure for the tether; determining a tether design length, the design length configured to provide a non-taut tether configuration when the structure is within the design volume; and attaching the tether to the structure.

BRIEF DESCRIPTION OF THE DRAWINGS

Embodiments of the invention are described in detail below with reference to the following drawings.

FIGS. 2a-2c are schematic views of mission phases of a space tether configuration in accordance with an embodiment of the invention;

DETAILED DESCRIPTION

Methods and systems for providing space tethers for limiting the dynamic response of structures are described herein. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

Figure 1:
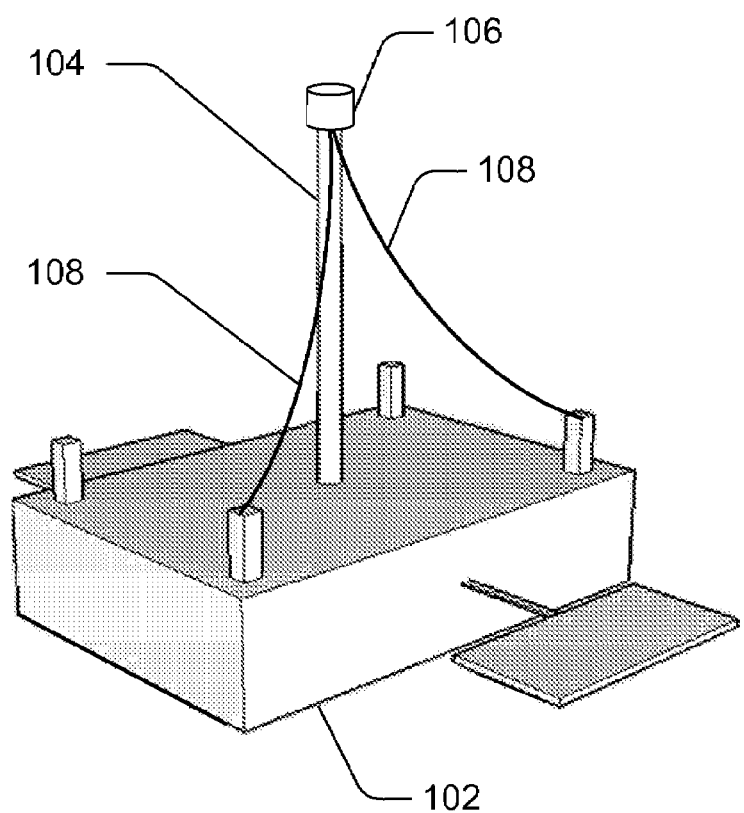
FIG. 1 is a plan view of a method or system of space tethers for limiting the dynamic response of a structure in accordance with an embodiment of the invention.

FIG. 1 illustrates an overall environment 100 of methods and systems for providing space tethers for limiting the dynamic response of structures in accordance with an embodiment of the invention. The environment 100 includes a structure 102. The structure 102 may be any space payload that includes a substructure 104, which undergoes dynamic response during transport to space. In one embodiment, the structure 102 may be a satellite. Alternatively, the structure 102 may be experiment apparatus, spacecraft, space station supplies, space exploration apparatus, or other structures that are transported into space and undergo dynamic response during transport to space.

As previously described, the structure 102 includes substructures 104. Substructures may be booms, antennas, wings, or any other protrusion from a structure 102 that is subjected to dynamic responses during transport to space which may cause damage to the substructure. For example, during the launch phase of a spacecraft, the spacecraft experiences large vibrational forces, particularly during the phase between initiation of the launch engines (e.g., rockets) and the first few minutes of flight. During the launch phase, the spacecraft payload, including the structure 102 and substructure 104 are subjected to the vibrations experienced by the spacecraft. These vibrations may result in the dynamic response of a substructure 104, such as by oscillating back and forth. The substructure 104 may bend, deform, or fracture from the dynamic response if the substructure 104 is not restrained and therefore may compromise the integrity of the substructure 104 or structure 102 and potentially lead to the failure or inoperability of a portion of the structure 102 or any part thereof (e.g., substructure 104, instrument 106, etc.).

In some embodiments, the substructure 104 includes an instrument 106. The instrument 106 may be located at the opposite end of the substructure 104 away from the structure 102, however other configurations are contemplated. In one embodiment, the instrument 106 may be a camera. Other instruments 106 may be configured with the substructure 104 to facilitate communication and observation with the structure while it is deployed in orbit, such as a sensor or antenna. The instrument 106 may be attached to the substructure or integrally formed with the substructure 104. The instrument 106 may further increase the dynamic response of the substructure during vibrations experienced during the launch phase of the spacecraft. For example, the instrument 106 may include additional mass, which when subjected to vibrational forces will propagate dynamic responses experienced by the substructure 104.

With continued reference to FIG. 1, the environment 100 includes at least one tether 108. The tether 108 may be any type of member, limited to withstanding tensile forces, that can translate between a non-taut state (e.g., slack) to a taut state. For example, the tether 108 may be a cable, wire, string, chain, cord, or the like. In one embodiment, the tether 108 may be comprised of braided Kevlar. In another embodiment, the tether 108 may be comprised of a strand of steel wire.

Figure 3:
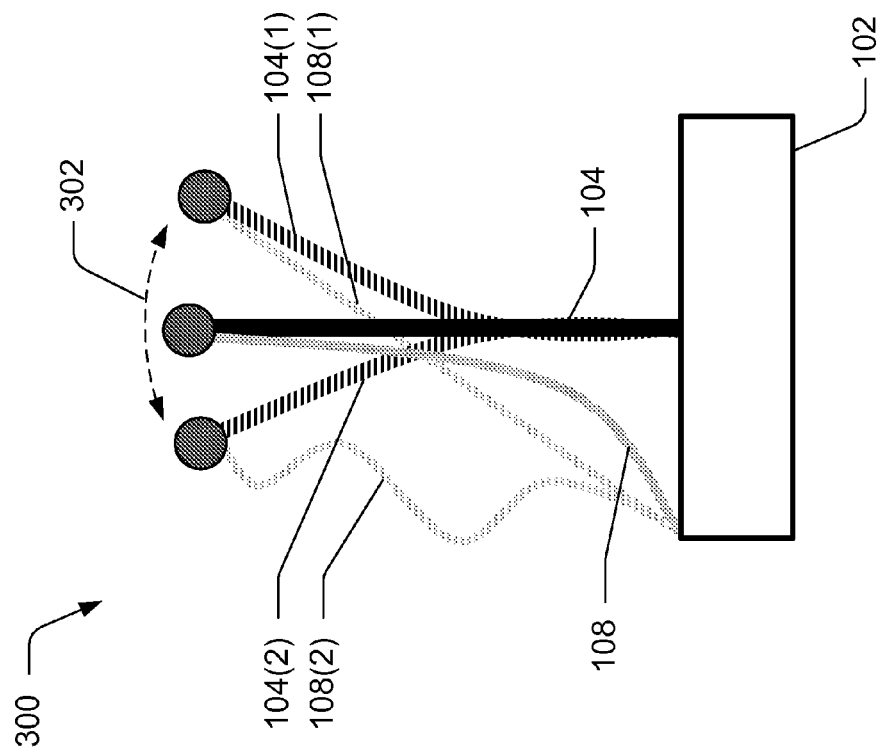
FIG. 3 is a schematic of a launch phase of a space tether configuration in accordance with an embodiment of the invention.

The tether 108 is configured in environment 100 in a position to limit the dynamic response of the substructure 104 during the launch phase while remaining in a non-taut state during the rest of the substructure's 104 operation (i.e., space mission). For example, a substructure 104 with tethers 108 is limited to dynamic response within a volume defined by the length of the tether 108. The tether 108 may be arranged in a variety of configurations to limit the dynamic response. In one embodiment, the tether 108 may be affixed between the structure 102 and the substructure 104. The tether 108 may be fastened to another object or itself by knots, fasteners, connectors, or any other fastening means. In an alternative embodiment, the tether may be affixed to an instrument 106. It is also contemplated that the tether 108 may limit the dynamic response of the substructure 104 during the launch phase without being attached to the substructure 104 or the instrument 106. For example, the tether 108 may be affixed between two different attachment points on the structure 102 such that the tether 108 limits the dynamic response of the substructure during the launch phase of the space transport of the structure 102. In yet another embodiment, the tether 108 may be affixed to a secondary tether 402, as depicted in FIG. 3.

FIGS. 2a, 2b, and 2c illustrate a tether configuration during three phases 200a, 200b, 200c of a mission of the structure 102 in accordance with an embodiment of the invention. The three phases 200a, 200b, 200c depict a tether configuration including a single tether 108a, 108b, 108c. Although only one tether configuration is depicted, other tether configurations are contemplated, such as utilizing two or more tethers 108. The first phase 200a depicts the tether configuration on earth prior to launch. The second phase 200b depicts the tether configuration when the structure 102 is in orbit in space after a relatively short period of time (e.g., one week) when the tether and structure have been subjected to the space environment and have reached a static deformation state. The third phase 200c depicts the tether configuration at the end of the operating mission of the structure 102. For example, the structure 102 may be designed to operate in space for 15 years, therefore in such instance the third phase 200c would represent the tether configuration at the end of the 15 year mission. Each phase will be discussed in turn with further detail.

With reference to the first phase 200a in FIG. 2a, the tether 108a is depicted as non-taut as configured between the structure 102 and the substructure 104a (or alternatively the instrument 106). In this phase, the tether 108a is subjected to the atmospheric conditions on earth such as temperature, pressure, and humidity. Under the earth's possible range of atmospheric conditions, the tether 108a may have a minimum length ($TE_{min}$) and a maximum length ($TE_{max}$). The length of the tether may vary between $TE_{min}$ and $TE_{max}$ due to changing atmospheric conditions, including those experienced during the early stages of the launch phase, as described above.

In the second phase 200b in FIG. 2b, the tether 108b is again depicted as non-taut as configured with the structure 102. In the second phase 200b, the tether 108b is subjected to the conditions of space (e.g., temperature, radiation, pressure, humidity, etc.) after the conditions have stabilized and the structure is not undergoing deformation because of a transition between the atmospheric condition variations between earth and space. For example, the structure's orbit in space does not contain any of the water contained in the atmosphere near earth. Additionally, the tether 108b may be exposed to radiation, large temperature variations, and other conditions that affect the length of the tether 108b. Therefore, the length of the tether 108a in the first phase 200a may change (e.g., shrink) to a new length of the tether 108b in the second phase 200b when subjected to the space conditions because the tether 108a may dry out when initially reaching space until the tether 108b has finished adjusting to the conditions of space and reaches a static deformation state. The tether may reach the second length, the initial length in space ($TS_i$) with a minimum length $TS_{i,min}$ and maximum length $TS_{i,max}$. For simplicity sake, the tether reaches static deformation at t(min), where t(min) may be an hour, day, week, month, or any other amount of time whereas the tether reaches its static deformation state. Similarly, substructure 104b may experience deformation upon the introduction of the conditions of space, therefore changing in shape from the state on earth of the substructure 104a, in the first phase 200a.

In the third phase 200c in FIG. 2c, the tether 108c depiction remains non-taut as configured with structure 102. In this phase, the structure 102 is at the end of its mission operation. During the duration of the mission, the structure 102, including any substructures 104c may become deformed. A deformation, bend, or other structural change in the substructure 104c may be caused by the conditions in space, such as temperature change or prolonged exposure to radiation. These conditions are typically predictable, thus the amount of potential deformation may be calculated for a substructure 104c subjected to the space environment during a mission. The important characteristic of the third phase 200c is the tether 108c configuration between the structure 102 and the deformed substructure 104c, whereas the tether 108c remains in a non-taut configuration. Throughout the transition from the second phase 200b to the third phase 200c, the tether 104b, 104c remains in a non-taut configuration and therefore does not interfere with the operation of the substructure 104b, 104c and any instrument 106.

FIG. 3 depicts a launch phase 300 of a space tether configuration. During the launch phase 300, the spacecraft (not shown) and its payload, including structure 102 and substructure 104, are subjected to vibrational forces, particularly during the early stages of the launch of the spacecraft. During the launch phase 300, the structure 102 may undergo large vibrational forces which may be caused by the rocket thrusting forces of the spacecraft, the effect of gravity on any payload, turbulence during flight, or other physical factors, which cause the spacecraft (and any payload such as structure 102) to experience vibrations. During these vibrations, the substructure 104 may undergo dynamic responses to the vibrations, such as to cause the substructure 104 to oscillate 302. For example, the range of positions of the substructure 104 subjected to a dynamic response may oscillate 302 from a first position of the substructure 104(1) to a second position of the substructure 104(2), whereas the tether 108 moves from a first tether position 108(1) to a second tether position 108(2), respectively. In the first tether position 108(1), the tether 108(1) is taut and limits further dynamic motion of the substructure 104(1) from the non-vibration position of the substructure 104. The tether restricts the dynamic response of the substructure outside of a predetermined design constraint volume (the maximum dynamic response of substructure 104). In the second tether position 108(2), the tether 108(2) is non-taut and thus the substructure 108(2) is unrestrained by the tether 108(2). The tether 108(2) is non-taut because the tether is limited to tensile forces.

In one embodiment, a single tether 108 may meet the design requirements of limiting the dynamic response of a substructure 108. Alternatively, other tethers may be attached to the substructure 104 and/or structure 102 (or other fixtures) to limit the dynamic response of the substructure 104 in other ranges of motion. For example, in FIG. 1, two tethers 108 are utilized to limit the dynamic response of the substructure 102. When the tethers are correctly configured on the structure and/or substructure, the substructure 104 will not experience a dynamic response causing operational failure or permanent deformation of the substructure 104 or structure 102. Further, any attached instrument 108, such as a camera or communication device, will be protected from damage or failure when subjected to dynamic responses by the substructure 104 constrained by the tether 108, such as damage from colliding with other structures within the launching vehicle, including the structure 102 and other substructures 104 attached to structure 102.

In order to provide the functionality as described in the FIGS. 2 and 3, the tether 108 is desirably configured to a proper design initial length. A number of factors must be considered to determine the initial length of the tether 108. The combined expansion, shrinkage, and deformation experienced by the tether 108, the substructure 104, and the structure 102 (if the tether is attached to the structure 102). Additionally, if multiple tethers 108 are utilized in the design, all tethers 108 must be considered for length changes during the elapse of all three phases discussed above (i.e., the mission duration).

In one embodiment, the length of the tether 108 at $t_{max}$ (at the end of the mission) must be greater than the maximum shrinkage of the tether during the elapsed mission plus the distance between the tether's 108 attachment locations at the end of the operating mission, thus ensuring the tether 108 is in a non-taut configuration throughout orbital phase of the mission. Further, this ensures that the tether 108 does not introduce environmentally-induced distortions into the substructure 104 or structure 102, such as by resisting an environmentally-induced deformation of the substructure 104. Environmentally-induced distortions may damage the operation of the structure 102 or substructure 104. For example, internal components, such as wires, mechanisms, etc. may be damaged if they cannot deform in accordance with the substructure 104.

The initial length of the tether 108 may also include additional factors. For example, the design length of the tether 108 will preferably not permit the tether 108 to become taut at any time during the structure's 102 mission in orbit. Additionally, the tether 108 will preferably not become taut during any phase of the transport from earth into space, except where the tether 108 is taut from counter-acting dynamic response forces due to vibration in the launch phase. Therefore, the length and deformation of the tether 108, substructure 104, and any other structures or tethers in connection with the tether 108 may be analyzed for expansion, shrinkage, and deformation in order to select the proper tether 108 length for use prior to launch. Further, the above consideration must be kept in mind when designing and determining the attachment points of the tether 108, therefore enabling a designer to position an appropriate length of tether 108 in relation to the substructure 104 to prevent critical dynamic response which results in deformation, damage, failure, or other undesirable consequences of the substructure 104, any instrument 106, and the structure 102.

Figure 4:
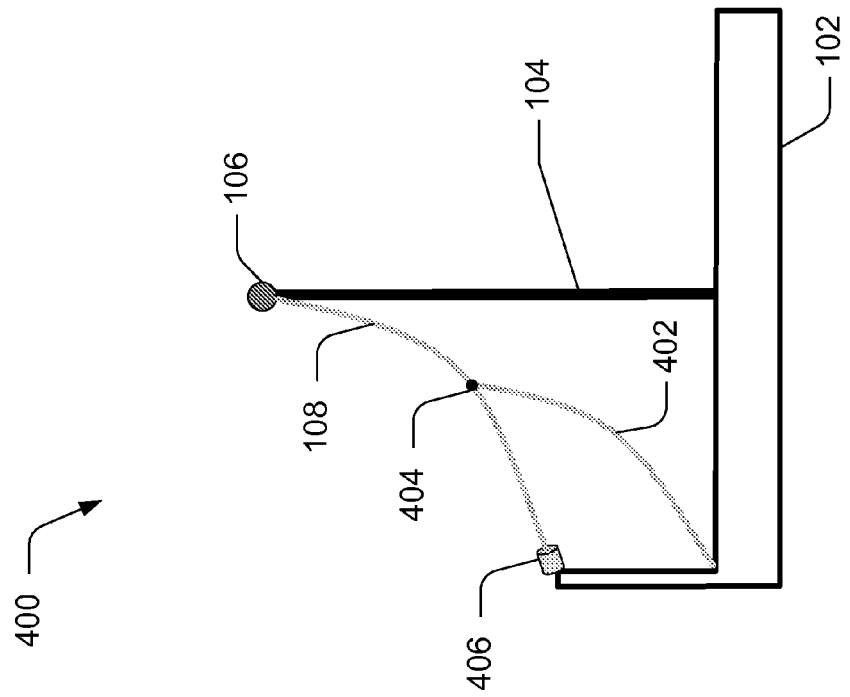
FIG. 4 is a schematic of a method or system of space tethers for limiting the dynamic response of a structure in accordance with another embodiment of the invention.

FIG. 4 illustrates an overall environment 400 of methods and systems for providing space tethers for limiting the dynamic response of structures in accordance with an embodiment of the invention. The environment 400 includes a structure 102, such as a satellite. Structure 102 further includes a substructure 104 extending from the surface of the structure 102, such as a boom or antenna. The substructure 104 may further include an instrument 106. The instrument 106 may be integrally formed with the substructure 104 or attached to the substructure 104, such as by bolts and nuts, welds, or other attachment means. Further, environment 400 includes at least one primary tether 108. The primary tether 108 may be a cable, wire, string, chain, cord, or the similar deformable structure, which can undergo tensile forces but is ineffective for providing compressive forces.

Additionally, a secondary tether 402 may be included in environment 400. The secondary tether 402 may provide further support for the primary tether 108 or the substructure 104 when the substructure 104 is subjected to dynamic responses such as by launch vibrations. The secondary tether 402 may be attached to the primary tether 108 at an attachment point 404, such as by a fastener, knot, or other connection. Alternatively, the secondary tether 402 may be attached to the substructure 104 or structure 102. The function of the secondary tether 402 may be either for providing additional strength to the primary tether 108 relating to control of the dynamic response of the substructure 104, or to restrain the primary tether 108 within a volume or range of motion when the primary tether is non-taut, such that the primary tether 108 will not interfere with other substructures, wings, solar panels, antennas, tethers, or other protrusions from the structure 102. For example, when the substructure 104 is subjected to dynamic responses, such as in FIG. 3, 104(1), 104(2), the primary tether 108 is non-taut and may interfere with other protrusions of the structure 102 by becoming entangled with such other protrusions. Therefore, a secondary tether 402 may be included to restrain the primary tether 108 within a design volume such that the primary tether 108 cannot become entangled or otherwise interfere with other protrusions from the structure 102.

In another embodiment of the invention, a motion control member 406 may be included in the tether configuration. For example, the motion control member 406 may be a biasing device and/or dampening device. In one embodiment, the motion control member 406 is a dampening device that reduces the impact force exerted on the substructure when the tether 108 (including the motion control member 406) becomes taut. In another embodiment, the motion control member 406 is a biasing device such as a coil spring. The motion control member 406 may be located within a tether 108, 402 or configured with a tether connection point such as to act between a tether 108, 402 and the structure 102 or substructure 104. Further, additional motion control members 406 may be utilized in any advantageous configuration, such as in series or in parallel configuration with one another.

Figure 5:
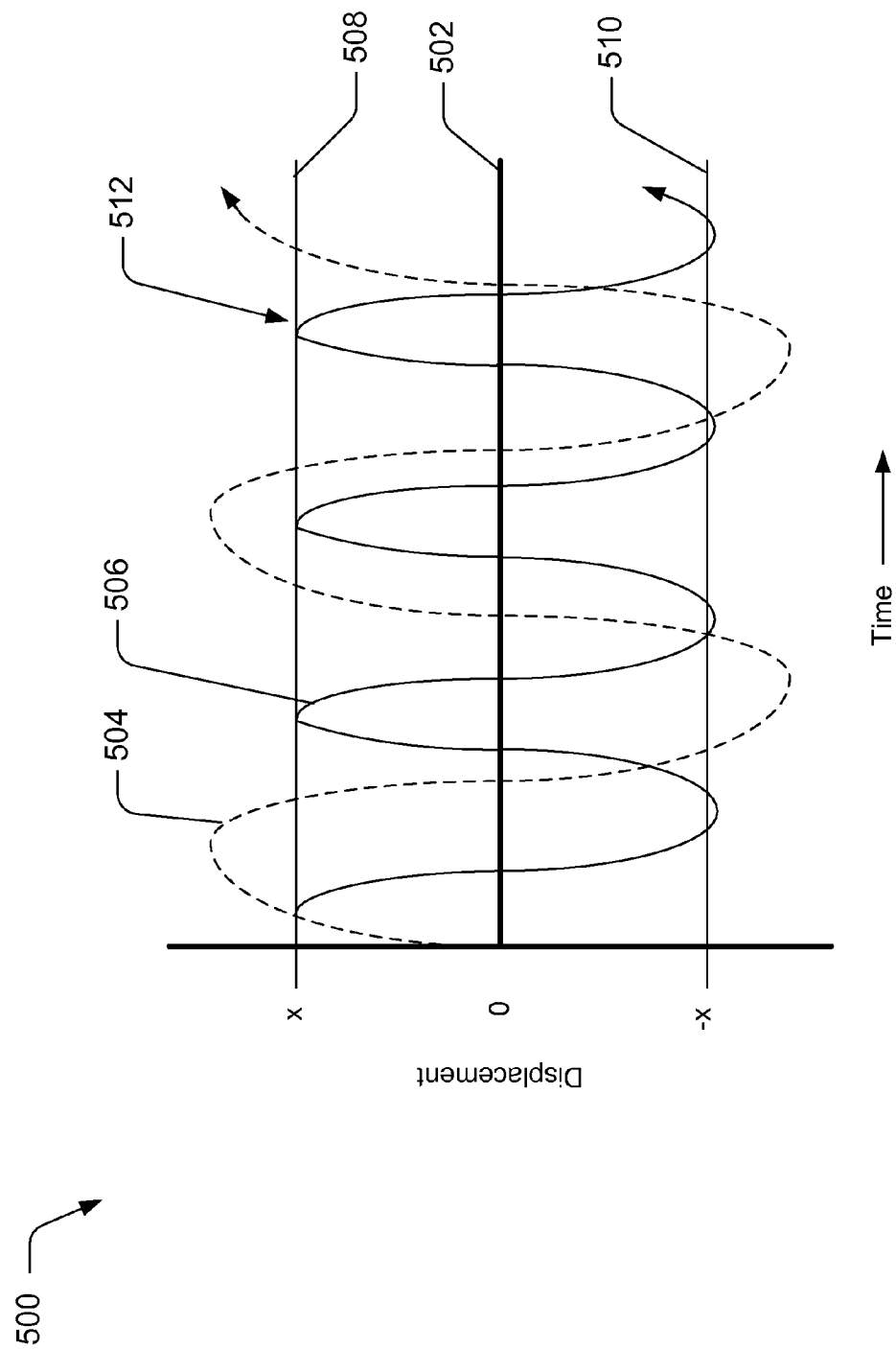
FIG. 5 is a chart illustrating the dynamic response of a structure subjected to launch conditions in accordance with an embodiment of the invention.

FIG. 5 is a chart 500 illustrating vibration of a structure experiencing launch conditions. Chart 500 includes an axis 502 representing zero displacement over a period of time. Plotted on chart 500 are two different exemplary curves: an unrestricted substructure curve ("unrestricted curve") 504 and a tethered substructure curve ("tethered curve") 506. The unrestricted curve 504 represents the oscillation of a substructure (such as FIG. 1, 106) subjected to vibrational forces, such as those experienced during the launch phase of a spacecraft. The unrestricted curve 504 is the dynamic response of a substructure without restraining features such as tethers. The shape of the unrestricted 504 is continuous and smooth. For example, the unrestricted curve 504 may be substantially similar to a sinusoidal curve.

The tethered curve 506 represents the dynamic response oscillation of a substructure subjected to vibrations forces when restricted by a tether (such as FIG. 1, 108). Although chart 500 only represents the tethered curve 506 of a substructure with a single tether, more tethers may be used to limit the dynamic response of the substructure. Line x 508 represents the limit of positive displacement of the substructure permitted by the tether. For example, when the substructure begins to experience dynamic response, the substructure may flex, bend, or deform away from the tether fastening point (e.g., in the positive x direction). While the tether is non-taut, the substructure may continue to experience varying displacement from axis 502. Once the tether becomes taut, such as when the tether curve 506 intersects line x 508, the tether is subjected to tensile forces which restrict the substructures deformation past line x 508. Next, the substructure begins to reduce displacement, thus the tethered curve 506 returns toward axis 502. The substructure continues its directional motion (dynamic response), thus the tethered curve 506 moves toward line −x 510. When the tethered curve 506 intersects line −x 510, it continues until the dynamic response energy is fully dissipated by the substructure and the substructure and tethered curve 200c begin to oscillate back toward axis 502. It should be appreciated that if a second tether were connected to the substructure in an equivalent, but opposite, position then the corresponding tethered curve (not shown) may be restrained from surpassing line −x 510 in the negative displacement direction.

The operation of the tether 108 during the launch phase is further explained below with reference to FIG. 5 and FIG. 3. The net effective damping force is defined to be the equivalent viscous damping force needed in a linear model of the substructure 104 without a tether to approximate the nonlinear behavior of the substructure 104 when a tether 108 is present. The tether configuration increases the net effective damping force by utilizing nonlinear aspects of two sets of mode shapes that describe the dynamic behavior and transfer of energy from modal coupling. First, the tether 108 constrains the substructure 104 in dynamic motion only when the dynamic motion creates enough displacement in the substructure 104(1) to make the tether 108(1) taut. The taut tether 108(1) only limits the displacement of the substructure 104 in a single linear direction, while all other displacement directions of the substructure 104 are unrestrained.

This one-direction constraint creates an unsymmetric boundary condition that is described mathematically with two different sets of equations of motion. Mathematically, the substructure 104 has a first set of vibration mode shapes when the tether 108 is non-taut and second set of vibration mode shapes when the tether 108 is taut. Sinusoidal resonance dynamic motion of a structure typically occurs when the mode shapes are identical for both directions of motion (e.g., curve 504 in FIG. 5). The tether configuration described herein creates two separate sets of mode shapes. First, any large displacement dynamic motion caused by sinusoidal excitations is dramatically reduced because a true resonance response is not possible with the disclosed tether configuration. Therefore, the lack of a true resonance response in the nonlinear behavior of the structure with tethers 108 requires an increase in the net effective damping force in a completely linear model of the substructure 104 without tethers 108 to approximate and bound the nonlinear, transient behavior. Second, the tether 108 creates conditions where energy is transferred from lower frequency modes to higher frequency modes.

When the tether 108 becomes taut, it creates an impulse-function input (i.e., shock impact) as depicted in FIG. 5 at location 512 along the tethered curve 506. An impulse-function input excites all modes of a substructure 104. The energy for the input is generated from the low frequency modes of vibration when the tether 108 is slack and is transferred to all of the higher frequency modes of the substructure 104 when the tether 108 is taut. This modal coupling from the tether 108 results in an energy transfer from the lower frequency modes to the higher frequency modes, which dissipate the energy more quickly as they vibrate at an increased rate. Therefore, the nonlinear modal coupling behavior of the substructure 104 with tethers 108 requires an increase in the net effective damping force in a completely linear model of the (lower frequency) substructure 104 without tethers 108 in order to approximate and bound the nonlinear, transient behavior.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of dampening dynamic responses of a structure coupled to a satellite that orbits around the earth, comprising:

determining predicted dynamic responses of the structure anticipated during a flight of the satellite in the orbit, the predicted dynamic responses to define a predicted response volume that includes space that the structure, when deflected in dynamic responses, occupies;

determining a containment volume and associated allowable dynamic responses of the structure anticipated during the flight, the containment volume being a subset of the predicted response volume;

selecting a tether to couple between a first attachment location on the structure and a second attachment location on a body of the satellite or the structure, wherein a length of the tether provides an unloaded configuration when the structure is within the containment volume and restricts the structure from deflecting out of the containment volume; and coupling the tether to the structure at the first attachment location and to the body of the satellite at the second attachment location.

2. The method of claim 1, wherein the tether includes at least one of a cable, a string, a synthetic filament, a chain, and a wire.

3. The method of claim 1, wherein the structure is a mobile platform.

4. The method of claim 1, wherein the tether comprises a plurality of tethers, and further comprising determining a placement of the plurality of tethers to restrict the structure from deflecting out of the containment volume.

5. The method of claim 1, wherein the second attachment location is selected to minimize the length of the tether.

6. The method of claim 1, wherein the selecting the elongated tether includes selecting the length that is pre-calculated to compensate for an anticipated reduction in the length of the tether due to material shrinkage when the structure is initially placed in the orbit such that the tether remains in an unloaded state when the structure is within the containment volume and after the material shrinkage.

7. The method of claim 1, further including coupling a dampening member to the tether at the first attachment location or the second attachment location.

8. The method of claim 1, further including coupling a biasing member to the tether at the first attachment location or the second attachment location.

9. The method of claim 1, wherein the tether is substantially composed of at least one of synthetic fiber-based cord or a steel wire.

10. The method of claim 9, wherein the tether is braided to provide at least one of additional strength, biasing, or dampening.

11. A method of claim 1, further comprising attaching an additional tether to the tether, the additional tether restraining the tether from moving outside of another containment volume when the tether is unloaded.

12. A method of restricting deflections of a structure coupled to a satellite, the method comprising, calculating, via a computing device, predicted dynamic responses of the structure;

modeling a predicted response volume defined by space occupied by the structure when exposed to the predicted dynamic responses;

designating a containment volume that is a subset of the predicted response volume, the containment volume being space occupied by the structure when subjected to the predicted dynamic responses without the structure interfering with operation of the satellite;

selecting a tether with a biasing device to couple between the structure and a body of the satellite, the tether to provide an unloaded tether configuration when the structure is within the containment volume and to restrict the structure from deflecting out of the containment volume; and coupling the tether to the structure and to the body of the satellite.

* * * * *